United States Patent
Li et al.

(10) Patent No.: US 10,187,807 B2
(45) Date of Patent: Jan. 22, 2019

(54) ANTENNA ARRAY UPLINK SECTOR SELECTION AND DESELECTION BASED ON COEXISTENCE WITH OTHER IN-DEVICE RADIOS

(71) Applicant: Apple Inc., Cupertino, CA (US)

(72) Inventors: Qiuming Li, Santa Clara, CA (US); Nicholas M. McDonnell, San Jose, CA (US)

(73) Assignee: Apple Inc., Cupertino, CA (US)

(*) Notice: Subject to any disclaimer, the term of this patent is extended or adjusted under 35 U.S.C. 154(b) by 110 days.

(21) Appl. No.: 15/272,196

(22) Filed: Sep. 21, 2016

(65) Prior Publication Data

US 2018/0084439 A1    Mar. 22, 2018

(51) Int. Cl.
*H04W 16/28* (2009.01)
*H04B 17/318* (2015.01)
*H04B 7/08* (2006.01)

(52) U.S. Cl.
CPC ............ *H04W 16/28* (2013.01); *H04B 7/088* (2013.01); *H04B 17/318* (2015.01)

(58) Field of Classification Search
CPC .... H04L 1/0026; H04L 1/0016; H04W 16/28; H04B 7/0617; H04B 7/0695
See application file for complete search history.

(56) References Cited

U.S. PATENT DOCUMENTS

| | | |
|---|---|---|
| 6,085,076 A | 7/2000 | Lindsay et al. |
| 6,970,721 B1 | 11/2005 | Gnesda et al. |
| 8,248,970 B2 | 8/2012 | Abramov et al. |
| 8,521,237 B2 | 8/2013 | Mohseni et al. |
| 2012/0113906 A1 | 5/2012 | Kadous et al. |

*Primary Examiner* — Shukri Taha
(74) *Attorney, Agent, or Firm* — Fletcher Yoder PC

(57) ABSTRACT

Systems, methods, and devices are provided for performing an antenna sector level sweep of a radio in a radio frequency system with co-existence of other radios. The method may involve sending a first command to a portion of a plurality of radios to determine a first set of signal quality metrics associated with the portion of the plurality of radios for one or more sectors of an antenna while the first radio is not active. The method may involve determining a second set of signal quality metrics associated with using the portion of the plurality of radios when the first radio is active via one or more sectors of a sector level sweep. The method also include generating a table that includes the second set of signal quality metrics and storing the table that indicates a portion of the sectors to avoid when the first radio performs a subsequent sweep.

20 Claims, 8 Drawing Sheets

| CELLULAR BANDS \ ANTENNA SECTORS | 11AD CH1 S1 | 11AD CH1 S2 | ... | 11AD CH1 S32 | ... | 11AD CH3 S1 | 11AD CH3 S2 | ... | 11AD CH3 S32 |
|---|---|---|---|---|---|---|---|---|---|
| LTE B2 | 1 | 1 | ... | 0 | ... | 1 | 1 | ... | 1 |
| LTE B5 | 0 | 1 | ... | 1 | ... | 1 | 1 | ... | 1 |
| ... | ... | ... | ... | ... | ... | ... | ... | ... | ... |
| GSM 850 | 0 | 1 | ... | 1 | ... | 1 | 1 | ... | 1 |
| GSM 900 | 1 | 1 | ... | 1 | ... | 1 | 1 | ... | 0 |
| ... | ... | ... | ... | ... | ... | ... | ... | ... | ... |
| WCDMA B1 | 1 | 1 | ... | 1 | ... | 1 | 1 | ... | 1 |
| ... | ... | ... | ... | ... | ... | ... | ... | ... | ... |
| CDMA BC0 | 0 | 1 | ... | 1 | ... | 1 | 1 | ... | 1 |
| ... | ... | ... | ... | ... | ... | ... | ... | ... | ... |
| TDSCDMA | 1 | 1 | ... | 1 | ... | 1 | 1 | ... | 1 |
| ... | ... | ... | ... | ... | ... | ... | ... | ... | ... |
| WLAN | 1 | 1 | ... | 1 | ... | 1 | 0 | ... | 1 |
| BT | 1 | 1 | ... | 0 | ... | 1 | 1 | ... | 1 |

*FIG. 7*

ANTENNA ARRAY UPLINK SECTOR SELECTION AND DESELECTION BASED ON COEXISTENCE WITH OTHER IN-DEVICE RADIOS

CROSS REFERENCE TO RELATED APPLICATIONS

This application is related to U.S. patent application Ser. No. 15/272,185, entitled "ANTENNA ARRAY UPLINK SECTOR LEVEL SWEEP TO ALLOW COEXISTENCE WITH OTHER IN-DEVICE RADIOS", filed Sep. 21, 2016, which is herein incorporated by reference in its entirety.

BACKGROUND

The present disclosure relates generally to radio frequency systems and, more particularly, to controlling an operation of a radio frequency system to mitigate interference by one radio with co-existing radios.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often include a radio frequency system to facilitate wireless communication of data with another electronic device and/or a network. To facilitate wireless communication, the radio frequency system may include multiple radios that communicate with other electronic devices, wireless access points, cellular base stations, and the like. Since each radio within the radio frequency system communicates via various frequency bands, antenna sectors, and other communication parameters, the operation of each radio within the radio frequency may affect the operation of other radios.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to radio frequency systems used to facilitate wirelessly communicating data. In certain electronic devices, multiple radios operate within a radio frequency system to transmit and receive data to and from other electronic devices, networks, and the like. Oftentimes, when multiple radios of the radio frequency system are active (e.g., transmitting or receiving), signals being transmitted from some of the radios may interfere with signals received by other radios. In some cases, the interference from some radios may inhibit the abilities of other radios from effectively transmitting or receiving accurate data packets.

With this in mind, in some embodiments, a processor of an electronic device may determine the quality of signals received by a number of different types of radio when one particular radio is active. As such, the processor may initially send a command to one of the number of radios to perform a baseline sensitivity search without any co-existing radios being active. The processor may then perform the sensitivity search again when the particular radio (e.g., millimeter wave radio) in the radio frequency system of an electronic device is active. The processor may generate certain metrics related to the quality of the data or signal received via each sector available during the sensitivity search with and without the co-existing radio. Based on the metrics, the processor may identify which sectors of the antenna sector sweep have relatively low isolation properties when the two different radios are active. The processor may store information related to which sectors of the antenna sector level sweep had a metric value greater than some threshold during the antenna sector level sweep when the two radios were active. In one embodiment, the processor may repeatedly perform this process for each of the number of different type of radios that are present on the radio frequency system with respect to the same particular radio.

Using the stored information that identifies the sectors that have metric values above the threshold when a pair of radios is active, the processor may avoid sweeping certain antenna sectors when performing an antenna sector level sweep prior to establishing a communication link with another electronic device. As such, the processor may reduce an amount of power used for performing a sector level sweep prior to transmitting data. Accordingly, by employing the selected antenna sectors to communicate data via the a certain radio of the electronic device, the processor ensures that the radio effectively communicates the relevant data while minimizing degrading the quality of the communication of other co-existing radios within the same electronic device.

BRIEF DESCRIPTION OF THE DRAWINGS

Various aspects of this disclosure may be better understood upon reading the following detailed description and upon reference to the drawings in which:

FIG. 7 is an example table that includes characterizations of antenna sectors of a radio in the electronic device of FIG. 1 with respect to the operation of other radios within the electronic device, in accordance with an embodiment;

DETAILED DESCRIPTION

Figure 1:
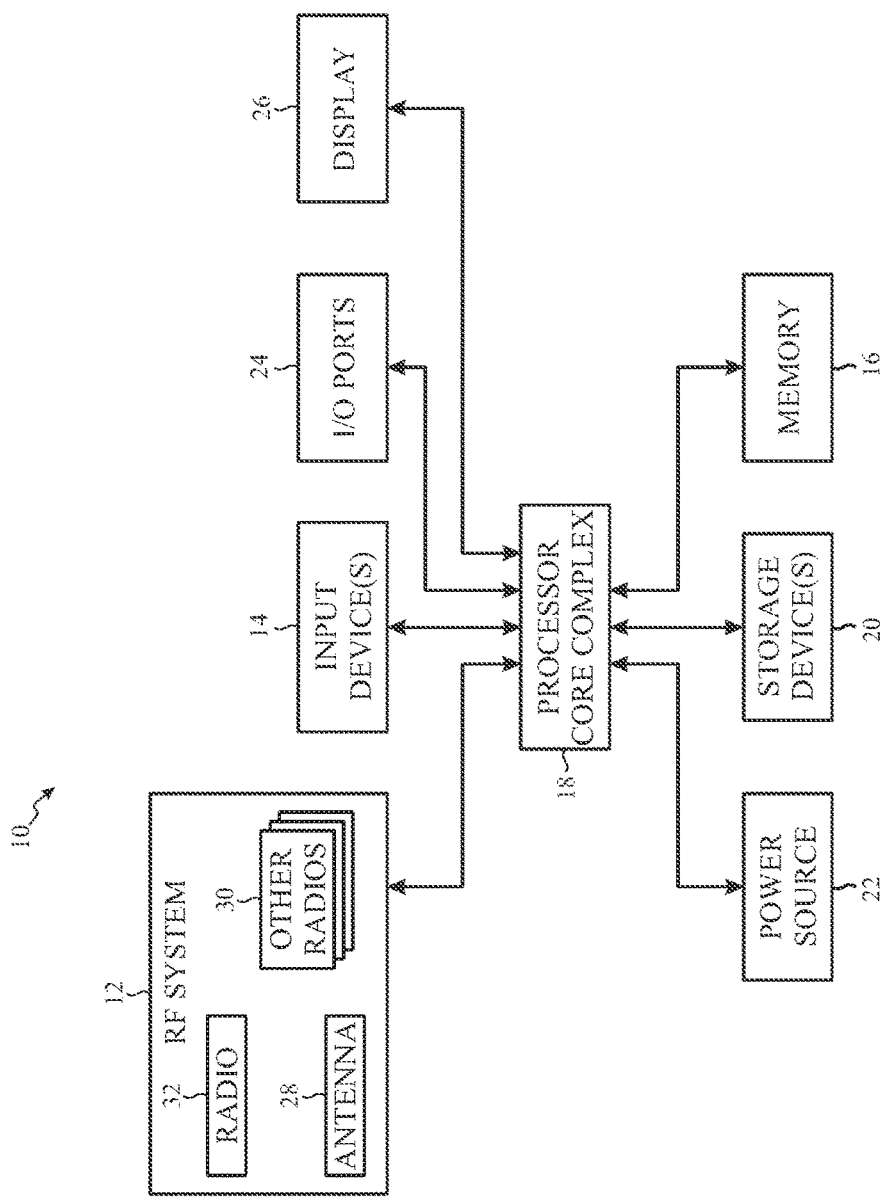
FIG. 1 is a block diagram of an electronic device with a radio frequency system, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logic OR) and not exclusive (e.g., logic XOR). In other words, the phase A "or" B is intended to mean A, B, or both A and B.

The present disclosure relates to radio frequency systems used to facilitate wirelessly communicating data between an electronic device and another electronic device and/or a network. For example, a radio frequency system may wirelessly communicate data by transmitting radio waves modulated in manner representative of the data, for example, via a personal area network (e.g., Bluetooth network), a local area network (e.g., an 802.11x Wi-Fi network), and/or a wide area network (e.g., a 4G, 5G, or LTE cellular network). In other words, radio frequency systems may utilize various wireless communication protocols to facilitate wireless communication of data.

Regardless of the wireless communication protocol, operation of radio frequency systems may be generally similar. For example, generally, processing circuitry may generate a digital representation of the data to be transmitted as a digital electrical signal and a transceiver (e.g., a transmitter and/or a receiver) may convert the digital electrical signal into an analog electrical signal. When transmitting the data, the radio frequency system may perform an antenna sector level sweep to identify one or more sectors of a respective antenna to use to transmit the data. In one embodiment, prior to transmitting data, the radio frequency system may perform a sector level sweep a number of times while different combinations of radios present on the radio frequency system are active. After performing the sector level sweep for each combination of radios, the radio frequency system may identify the sectors of the sector level sweep that have metric data above and below some threshold. The radio frequency system may—generate a characterization table that indicates which sectors have metrics above the threshold and which sectors have metrics below the threshold for each combination of active radios. The radio frequency system may store the characterization table for use when establishing a communication link with another electronic device. That is, when the radio frequency system receives a request to start transmitting data using a particular radio, the radio frequency system may identify the other radios that are active during the requested transmission and perform a sector level sweep using the sectors that have metrics less than the threshold according to the stored characterization table. As such, the radio frequency system may perform sector level sweeps more efficiently by avoiding sweeping sectors that are known to cause interference with other active radios.

To help illustrate, one embodiment of an electronic device 10 including a radio frequency system 12 is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the radio frequency system 12, one or more input devices 14, local memory 16, a processor core complex 18, one or more main memory storage devices 20, a power source 22, one or more input/output ports 24, and an electronic display 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 16 and a main memory storage device 20 may be included in a single component.

As depicted, the processor core complex 18 is operably coupled with local memory 16 and the main memory storage device 20. Thus, the processor core complex 18 may execute instruction stored in local memory 16 and/or the main memory storage device 20 to perform operations, such as instructing the radio frequency system 12 to communicate with another electronic device and/or a network. As such, the processor core complex 18 may include one or more general purpose microprocessors, one or more application specific processors (ASICs), one or more field programmable logic arrays (FPGAs), or any combination thereof.

In addition to the instructions, the local memory 16 and/or the main memory storage device 20 may store data to be processed by the processor core complex 18. Thus, in some embodiments, the local memory and/or the main memory storage device 20 may include one or more tangible, non-transitory, computer-readable mediums. For example, the local memory 16 may include random access memory (RAM) and the main memory storage device 20 may include read only memory (ROM), rewritable non-volatile memory such as flash memory, hard drives, optical discs, and the like.

As depicted, the processor core complex 18 is also operably coupled with the I/O ports 24. In some embodiments, the I/O ports 24 may enable the electronic device 10 to interface with other electronic devices. For example, a portable storage device may be connected to an I/O port 24, thereby enabling the processor core complex 18 to communicate data with a portable storage device.

Additionally, as depicted, the processor core complex 18 is operably coupled to the power source 22. In some embodiments, the power source 22 may provide power to one or more components in the electronic device 10, such as the processor core complex 18 and/or the radio frequency system 12. Thus, the power source 22 may include any suitable energy source, such as a rechargeable lithium polymer (Li-poly) battery and/or an alternating current (AC) power converter.

Furthermore, as depicted, processor core complex 18 is operably coupled with the input devices 14. In some embodiments, the input device 14 may facilitate user interaction with the electronic device 10, for example, by receiving user inputs. Thus, the input devices 14 may include a button, a keyboard, a mouse, a trackpad, and/or the like. Additionally, in some embodiments, the input devices 14 may include touch-sensing components in the electronic display 26. In such embodiments, the touch-sensing components may receive user inputs by detecting occurrence and/or position of an object touching the surface of the electronic display 26.

In addition to enabling user inputs, the electronic display 26 may display image frames, such as a graphical user interface (GUI) for an operating system, an application interface, a still image, or video content. As depicted, the electronic display 26 is operably coupled to the processor core complex 18. In this manner, the electronic display 26 may display image frames based at least in part on image data received from the processor core complex 18.

As depicted, the processor core complex 18 is also operably coupled with the radio frequency system 12. As described above, the radio frequency system 12 may facilitate wirelessly communicating data with another electronic device and/or a network. For example, the radio frequency system 12 may enable the electronic device 10 to communicatively couple to a personal area network (PAN), such as a Bluetooth network, a local area network (LAN), such as an 802.11x Wi-Fi network, and/or a wide area network (WAN), such as a 4G, 5G, or LTE cellular network. In other words, the radio frequency system 12 may enable wirelessly communicating data using various communication protocols and/or at various output powers (e.g., strength of transmitted analog electrical signals).

In some embodiments, the radio frequency system 12 may include one or more antennas 28, and at least one of the antennas 28 may have a number of antenna sectors. Each antenna sector may include one or more antenna elements. The radio frequency system 12 thus may transmit and/or receive signals via the one or more antennas 28 using one or more antenna sectors. In addition, the radio frequency system 12 may include a number of radios 30, 32 that may communicate with one or more other electronic devices via the antenna 28. Each radio 30, 32 may include hardware and/or software that enables the respective radio 30, 32 to communicate via a particular protocol, with a particular type of electronic device, via a particular type of mobile data processing station, or the like. In one embodiment, the radio frequency system 12 may include a millimeter-wave (MMW) radio (e.g., radio 32). Millimeter wave communications, which are sometimes referred to as extremely high frequency (EHF) communications, involve communications at frequencies of about 10-400 GHz. Operation at these frequencies may support high bandwidths. In addition, the radio frequency system 12 may include other radios 30 that are capable of communicating with Wi-Fi devices, global positioning system (GPS) devices, cellular devices, Bluetooth® devices, and the like.

Even when using different communication protocols, operational principles of radio frequency systems 12 may be generally similar. For example, as will be described in more detail below, the radio frequency system 12 may use a transceiver to convert a digital electrical signal, which digitally represents data to be transmitted, into an analog electrical signal, thereby generating an analog representation of the data. Additionally, the radio frequency system 12 may use an amplifier device to amplify the analog electrical signal to a target output power, thereby generating an amplified analog electrical signal. Based at least in part on the amplified analog electrical signal, the radio frequency system 12 may output modulated radio waves to wirelessly communicate the data to another electronic device and/or a network. Due to similarities in operational principles, the techniques described herein may be applicable to any suitable radio frequency system 12 regardless of communication protocol.

Figure 2:
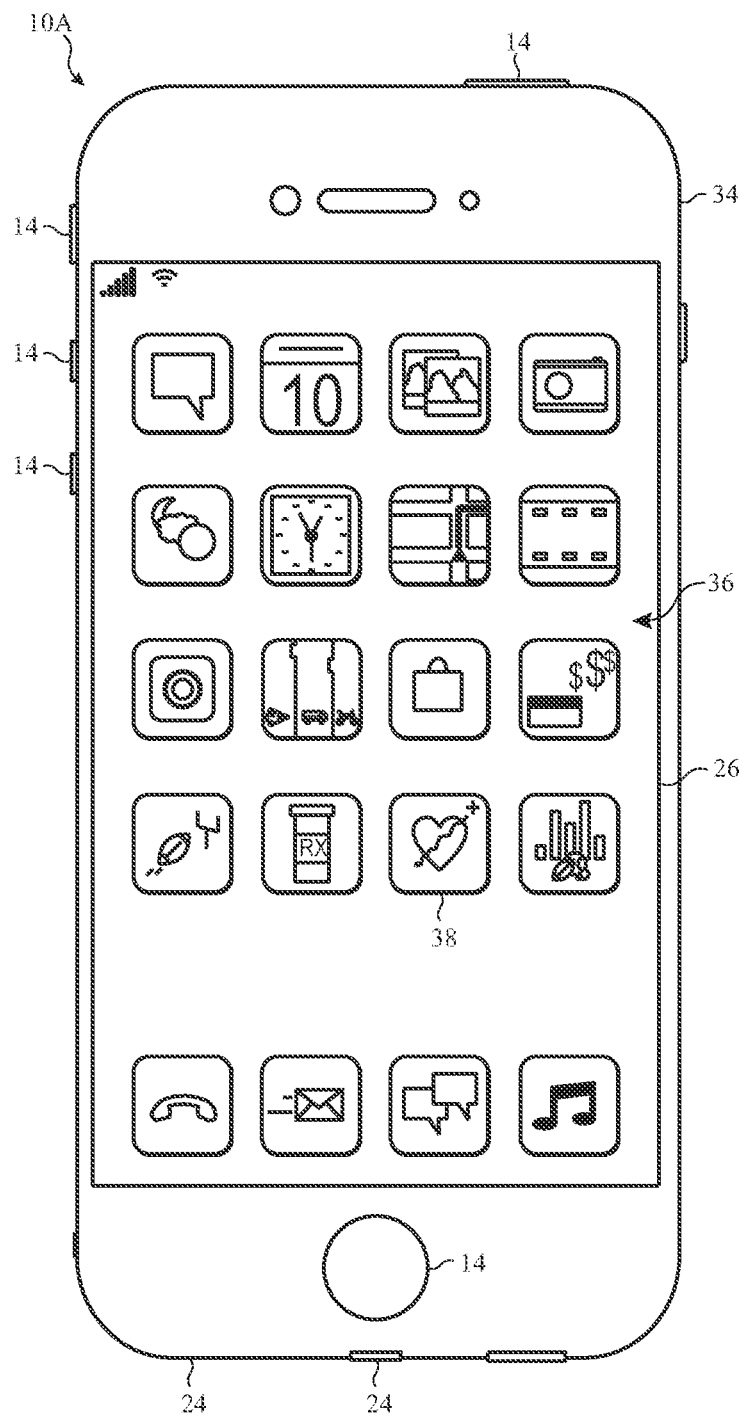
FIG. 2 is a front view of a hand-held device representing an example of the electronic device of FIG. 1, in accordance with an embodiment.

As described above, the electronic device 10 may be any suitable electronic device. To help illustrate, one example of a suitable electronic device 10, specifically a handheld electronic device 10A, is shown in FIG. 2. In some embodiments, the handheld electronic device 10A may be a portable phone, a media player, a personal data organizer, a handheld game platform, and/or the like. For example, the handheld electronic device 10A may be a smart phone, such as any iPhone® model available from Apple Inc.

As depicted, the handheld electronic device 10A includes an enclosure 34 (e.g., housing). In some embodiments, the enclosure 34 may protect interior components from physical damage and/or shield them from electromagnetic interference. Thus, a radio frequency system 12 (not shown) may also be enclosed within the enclosure 34 and internal to the handheld electronic device 10A. In some examples, the enclosure 34 may operate as part of the antenna 28 of the radio frequency system 12.

Additionally, as depicted, the enclosure 34 may surround the electronic display 26. In the depicted embodiment, the electronic display 26 is displaying a graphical user interface (GUI) 36 having an array of icons 38. By way of example, when an icon 38 is selected either by an input device 14 or a touch sensing component of the electronic display 26, an application program may launch.

Furthermore, as depicted, input devices 14 open through the enclosure 34. As described above, the input devices 14 may enable a user to interact with the handheld electronic device 10A. For example, the input devices 14 may enable the user to activate or deactivate the handheld electronic device 10A, navigate a user interface to a home screen, navigate a user interface to a user-configurable application screen, activate a voice-recognition feature, provide volume control, and/or toggle between vibrate and ring modes. As depicted, the I/O ports 24 also open through the enclosure 34. In some embodiments, the I/O ports 24 may include, for example, a multi-function connector port (e.g., Lightning port) to connect to external devices.

Figure 3:
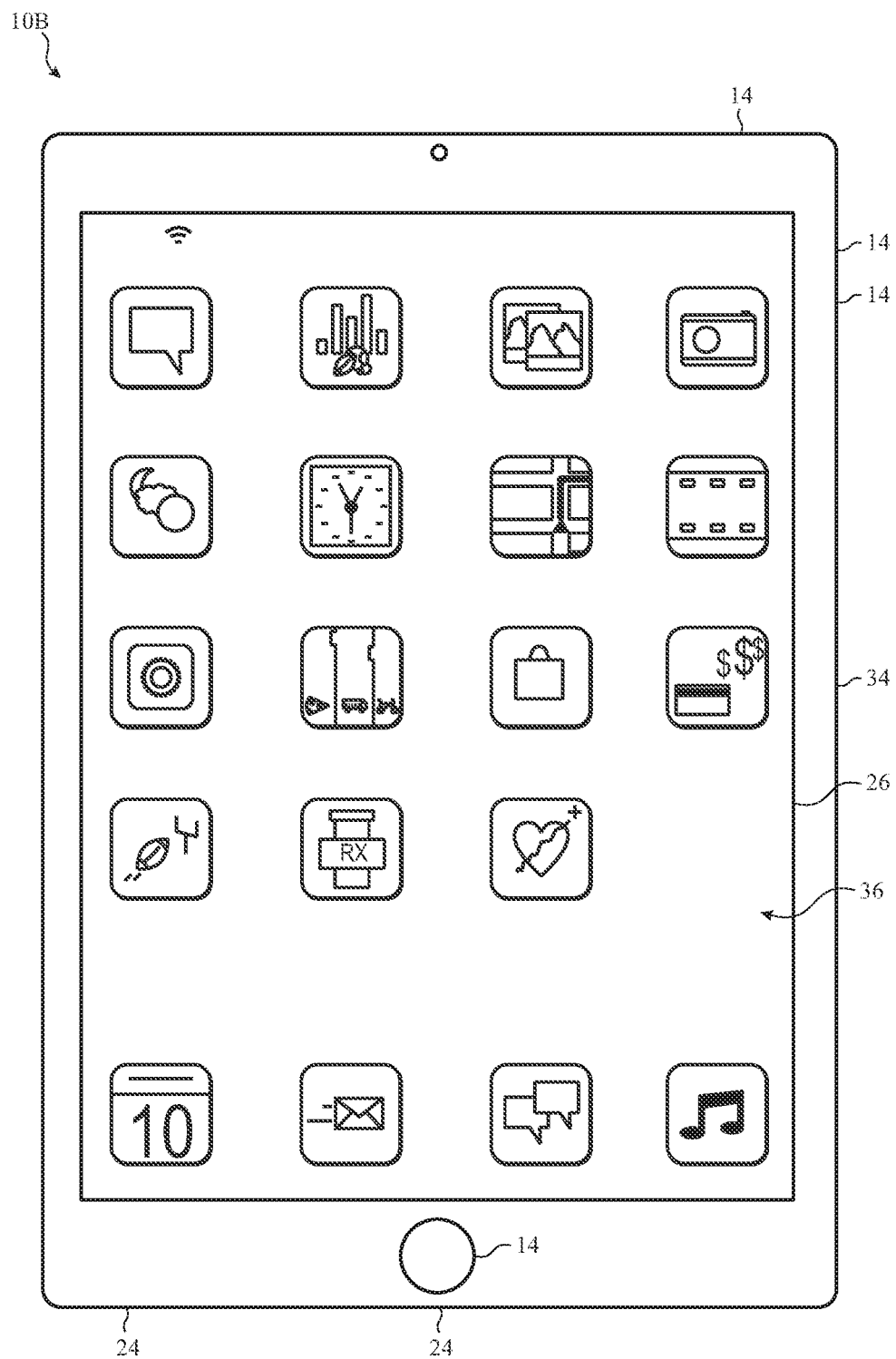
FIG. 3 is a front view of another hand-held device representing another example of the electronic device of FIG. 1, in accordance with an embodiment.
Figure 4:
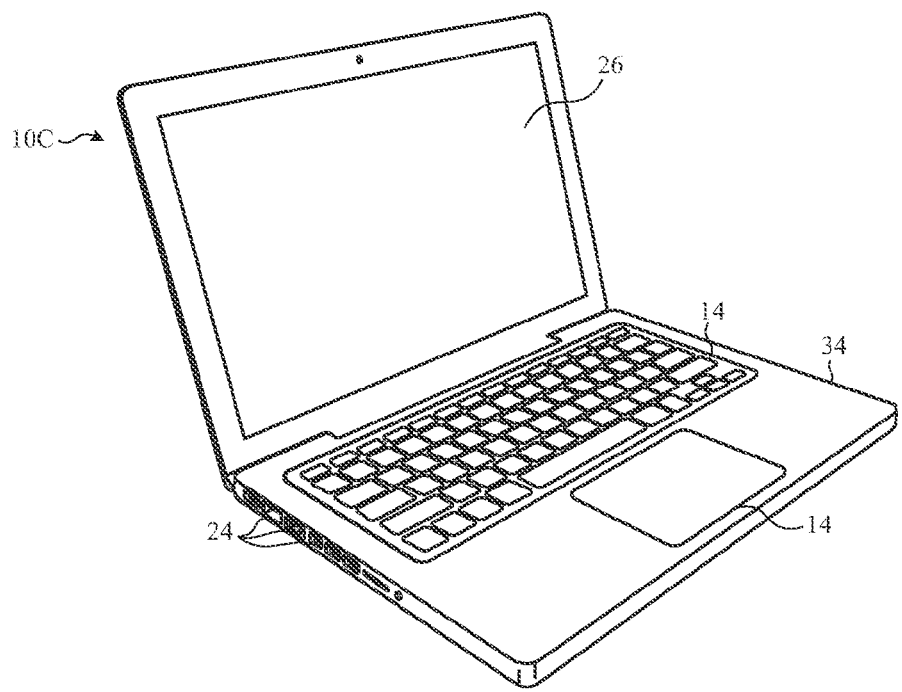
FIG. 4 is a perspective view of a notebook computer representing another example of the electronic device of FIG. 1, in accordance with an embodiment.
Figure 5:
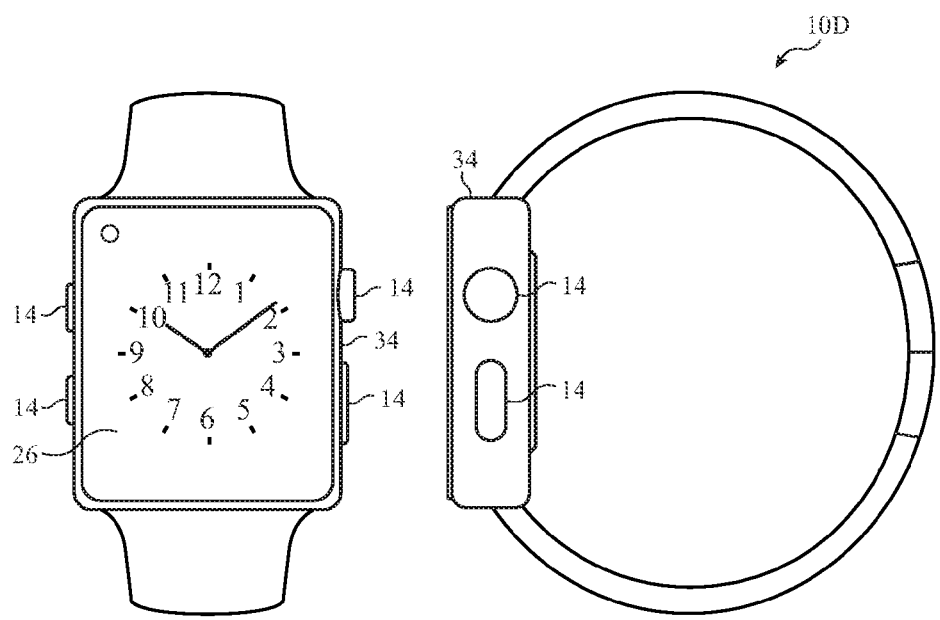
FIG. 5 is a front view of a wearable electronic device representing another example of the electronic device of FIG. 1, in accordance with an embodiment.

To further illustrate, another example of a suitable electronic device 10, specifically a tablet electronic device 10B is shown in FIG. 3. For example, the tablet electronic device 10B may be any iPad® model available from Apple Inc. A further example of a suitable electronic device 10, specifically a computer 10C, is shown in FIG. 4. For example, the computer 10C may be any Macbook® or iMac® model available from Apple Inc. Another example of a suitable electronic device 10, specifically a watch 10D, is shown in FIG. 5. For example, the watch 10D may be any Apple Watch® model available from Apple Inc.

As depicted, the tablet electronic device 10B, the computer 10C, and the watch 10D each also include an electronic display 26, input devices 14, I/O ports 24, and an enclosure 34. Thus, in some embodiments, the enclosure 34 may enclose a radio frequency system 12 in the tablet electronic device 10B, the computer 10C, and/or the watch 10D. As described above, a radio frequency system 12 may facilitate wirelessly communicating data with other electronic devices and/or a network.

As discussed above, the radio frequency system 12 may include a number of different radios 30, 32 that may communicate with a variety of electronic devices via a variety of different communication protocols. When different combinations of radios are active or communicating at the same time, the signals being transmitted or received via the radio 32 may interfere with the signals being transmitted or received via the other radios 30 in the radio frequency system 12. As such, the presently disclosed systems and techniques are related to mitigating the interference of signals being transmitted or received via other radios (e.g., radio 30) due to the signals being transmitted or received via the first radio 32.

Figure 6:
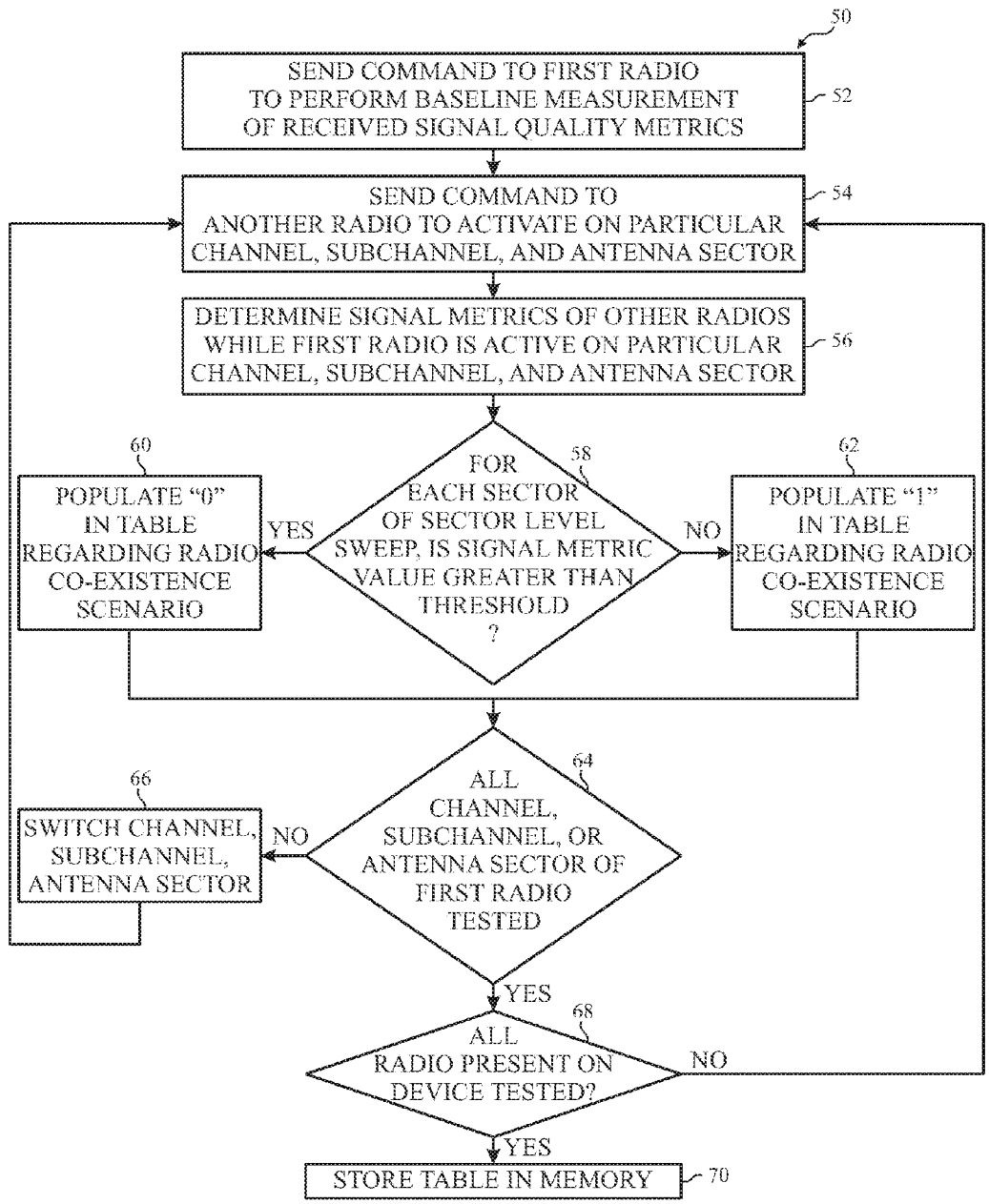
FIG. 6 is flow chart of a method for characterizing various antenna sectors of a radio being used in the electronic device of FIG. 1 with respect to other radios within the same electronic device, in accordance with an embodiment.

With the foregoing in mind, FIG. 6 illustrates a flow chart of a method 50 for characterizing various antenna sectors of the antenna 28 being used by the radio 32 (e.g., MMW radio) with respect to the operation of other radios 30 in the radio frequency system 12. For the purposes of discussion, the following description of the method 50 will be described as being performed by the processor core complex 18, but it should be noted that any suitable processor capable of controlling the operation of a number of radios 30, 32 may be employed. Moreover, although the following description of the method 50 is described as being performed in a particular order, it should be understood that the method 50 may be performed in any suitable order.

Referring now to FIG. 6, at block 52, the processor core complex 18 may send a command to one of the other radios 30 of the radio frequency system 12 to perform a baseline sensitivity search. It should be noted that the baseline sensitivity search is an example of a type of receiver signal quality metrics that may be determined by the other radios 30. Other receiver signal quality metrics may also include Received Signal Strength Indicator (RSSI), Reference Signal Received Power (RSRP), Reference Signal Received Quality (RSRQ), Received Signal Code Power (RSCP), Receiver Automatic Gain Control (Rx AGC), Traffic Channel Receive Level (TCH Rx Level), and the like.

The sensitivity search may involve determining a receive signal quality measurement, a sensitivity level, a noise floor, or other noise characteristics of the selected other radio 30 when the selected other radio 30 is receiving data. As such, in one embodiment, performing the baseline sensitivity search may involve receiving data packets at selected other radio 30 from a base station or some other electronic device. As the selected other radio 30 receives the data packets, the base station or some other electronic device may decrease its downlink power until the data packets by other radios 30 have a certain error rate (e.g., bit error rate) above a threshold that corresponds to when the communication link is considered lost or unable to maintain a connection between the two devices. As such, each other radio 30 may determine an absolute minimum downlink power to maintain the connection between each other radio 30 and the other electronic device. Each other radio 30 may send the relevant information regarding the sensitivity, the noise floor, or the noise characteristics associated with selected other radio 30 to the processor core complex 18, which may then store the relevant information in the memory 16, the storage device 20, or any other suitable digital storage device.

After receiving the results of the baseline sensitivity search, at block 54, the processor core 18 may send a command to the radio 32 (e.g., MMW radio) within the radio frequency system 12 to activate on a particular channel, sub-channel, and antenna sector. At block 56, the processor core complex 18 may determine certain metrics associated with the signal strength or signal quality received via the selected other radio 30 while the radio 32 activated at block 54 is active on a particular channel, subchannel, or sector with respect to the baseline sensitivity search performed at block 52. The signal quality may be measured or determined using a variety of techniques, such as a received signal bit error rate, a signal-to-noise ratio (SNR), and the like. As such, the processor core complex 18 may determine some metric value related to the strength of a received signal for each sector of the sector level sweep. The metric value may be any suitable measurement of an impact to the signal strength of the selected other radio 30. By way of example, the metric may be a Received Signal Strength Indicator (RSSI), as determined by an RSSI sweep, or the like.

Regardless of the type of metric used to evaluate the signal strength of the selected other radio 30, the metric may indicate whether the noise characteristics (e.g., sensitivity, noise floor) associated with the selected other radio 30, as compared to the results of the baseline sensitivity search, have changed. In one embodiment, at block 58, the processor core complex 18 may determine whether the metric for each sector of the sector level sweep is greater than some threshold. The threshold may be related to sensitivity degradation (e.g., degradation information) of the other radios 30 when the first radio 32 is active compared to the baseline sensitivity when the first radio 32 is not active (e.g., off).

For each sector of a sector level sweep that the metric value is greater than the threshold, the processor core complex 18 may proceed to block 60 and populate a "0" value in a table (e.g., characterization table) that characterizes whether the active radio 32 operating on a respective sector, channel, or subchannel is interfering with the selected other radio 30 or not. The characterization table may, in one example, provide a list of cellular bands, which may be used by the selected other radio 30, in one column and a list of antenna sectors of the sector level sweep for all channels and sub-channels along a row of the table. As such, the characterization table may provide information related to the ability of the selected other radio 30 to effectively communicate with another electronic device with respect to various radio co-existence scenarios. That is, after the method 50 is performed for a number of the other radios 32, the characterization table may provide representations of a number of radio co-existence scenarios that correspond to various types of radios 30 of the radio frequency system 12 being active when the radio 32 is also active.

FIG. 7 illustrates an example characterization table 80 that illustrates various entries having a "0" entry to indicate that the corresponding antenna sector and cellular band pair does causes a certain level of interference with the selected other radio 30, such that the metric value determined at block 56 for the respective pair is greater than the threshold. As such, the "0" populated in an entry of the characterization table 80 may indicate that the respective sector should not be used during a sector level sweep when the selected other radio 30 is attempting to communicate with another electronic device when the radio 32 is active.

On the other hand, for each sector of the sector level sweep that the metric value is not greater than the threshold, the processor core complex 18 may proceed to block 62 and populate a "1" value in the characterization table. As such, the "1" populated in an entry of the characterization table 80 may indicate that the respective sector should be used during a sector level sweep when the selected other radio 30 is attempting to communicate with another electronic device when the radio 32 is active. Although the characterization table is described as being populated with "0" or "1," it should be understood that these values are merely provided as examples to indicate whether the use of the radio 32 may interfere with a corresponding cellular band and sector pair used by the selected other radio 30.

After populating the characterization table 80 for the particular channel, sub-channel, and antenna sector, as provided in block 54, the processor core complex 18 may proceed to block 64 and determine whether another channel, sub-channel, and antenna sector has been tested for the radio 32. If the processor core complex 18 determines that another channel, sub-channel, and antenna sector permutation has not been tested, the processor core complex 18 may proceed to block 66 and identify a new channel, sub-channel, and antenna permutation. The processor core complex 18 may then repeat blocks 54-64 for the newly identified permutation. Although blocks 54, 64, and 66 are described with regard to a channel, sub-channel, and an antenna sector, it should be noted that the method 50 may be performed based solely on an antenna sector or any combination of an antenna sector and a channel or a sub-channel.

If, at block 64, the processor core complex 18 determines that the available channel, sub-channel, and antenna sector permutations that have been tested, the processor core complex 18 may proceed to block 68 and determine whether another radio is present on the radio frequency system 12 or the electronic device 10. If another radio is present on the radio frequency system 12 or the electronic device 10, the processor core complex 18 may proceed to return to block 52 and perform blocks 52-64 again with respect to the newly identified radio. Additionally or alternatively, if the available radios present on the radio frequency system 12 or the electronic device 10 have been tested, the processor core complex 18 may proceed to block 70 and store the characterization table 80 in the storage device 20 or the memory 16. As such, the processor core complex 18 may use the resulting characterization table 80 to determine which antenna sectors, channels, and sub-channels to sweep prior to establishing a communication link with another electronic device.

With regard to the method 50, the characterization of the various antenna sectors of the antenna 28 being used by the radio 32 may indicate whether the other radios 30 can communicate when it has a signal strength that is greater than some threshold. In this way, the processor core complex 18 may predetermine which sectors of the antenna 28 to sweep prior to establishing a communication link with another electronic device. Additional details with regard to the process for using the characterization table 80 when communicating with another electronic device is provided below with reference to FIG. 8.

Figure 8:
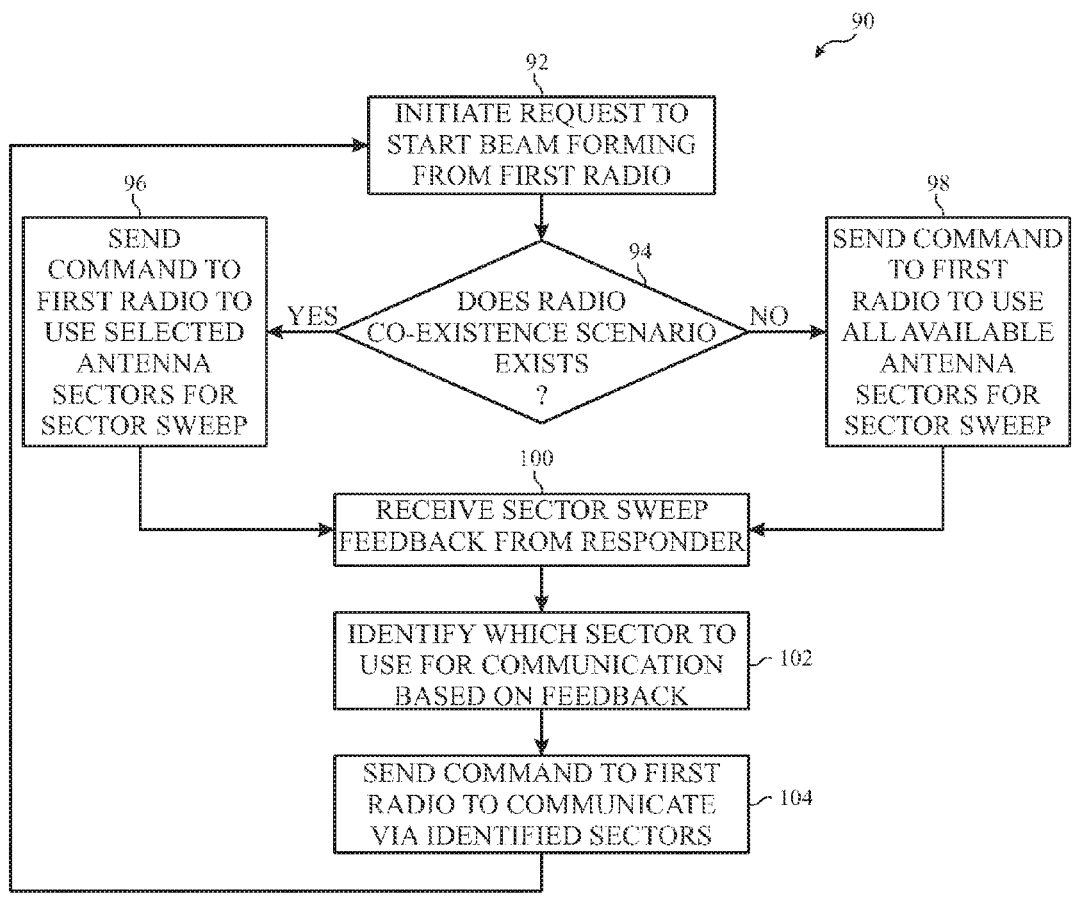
FIG. 8 is a flow chart of a method for communicating via selected antenna sectors of a radio in the electronic device of FIG. 1 while accounting for the operation of other radios in the electronic device, in accordance with an embodiment.

FIG. 8 illustrates a method 90 for communicating via selected antenna sectors of the radio 32 while accounting for the operation of the radio 32, in accordance with embodiments herein. Like the method 50 of FIG. 6, the method 90 is described as being performed by the processor core complex 18, but it should be understood that the method 90 may be performed by any suitable processor device. Moreover, although the method 90 is described as being performed in a particular order, it should be noted that the method 90 may be performed in any suitable order.

Referring now to FIG. 8, at block 92, the processor core complex 18 may initiate a request to start beamforming using the radio 32. Beamforming may include performing an antenna sector level sweep to determine a directional signal transmission or reception path or sector to use when communicating with another device.

After the request to start beamforming is received, at block 94, the processor core complex 18 may determine whether a radio co-existence scenario exists. That is, the processor core complex 18 may determine if another radio 30 within the radio frequency system 12 is presently active.

If another radio 30 is active, the processor core complex 18 may proceed to block 96 and send a command to perform a sector level sweep using selected antenna sectors, channels, and sub-channels based on the characterization table 80. That is, the processor core complex 18 may identify the combination of the radio 32 that is active along with another radio 30 on the characterization table 80 and identify the sectors, channels, and sub-channels to sweep at block 96 based on the characterization table. In other words, if the processor core complex 18 determines that the signal strength of the other radio 30 is not viable for communication for particular channels, sub-channels, or antenna sectors for a present radio co-existence scenario, the processor core complex 18 may send a command to the radio 32, at block 96, to perform a sector level sweep while excluding certain sectors, channels, or sub-channels, as per the characterization table 80.

Figure 9:
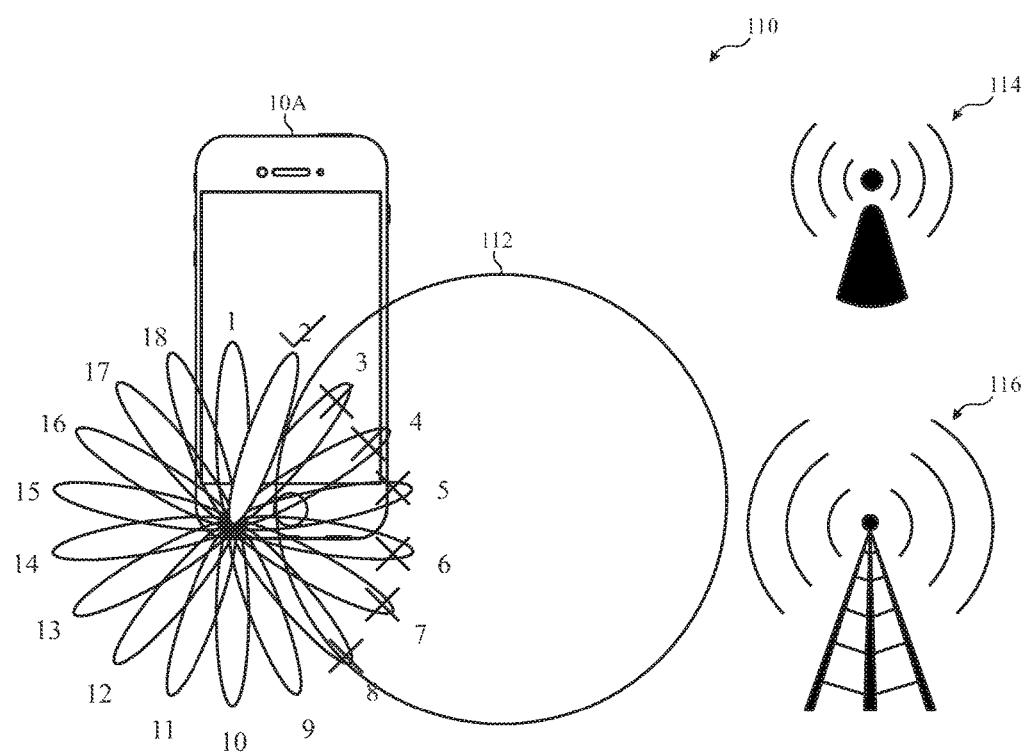
FIG. 9 is a schematic diagram illustrating a number of antenna sectors of a radio that are characterized as interfering with other radios in the electronic device of FIG. 1, in accordance with an embodiment.

FIG. 9 provides an illustration 110 of the processor core complex 18 performing a sector level sweep using select sectors, channels, and sub-channels. As shown in FIG. 9, the radio 32 may perform a sector level sweep for sector numbers 1, 2, and 9-18 while skipping sectors 3-8. According to the illustration 110, signals 112 due to the active other radios 30 may interfere with sectors 3-8 of the radio 32 within the electronic device 10A. As such, when the processor core complex 18 preforms the method 50 of FIG. 6, the processor core complex 18 may generate the characterization table 80 that indicates that sectors 3-8 of the radio 32 cause interference of the other radio 30 when the other radio 30 is active. With this in mind, when the processor core complex 18 performs block 96 of the method 90, the processor core complex 18 may accordingly send a command to the radio 32 to perform a sector level sweep for just sectors, 1, 2, and 9-18.

Referring back to FIG. 8, if, at block 94, the processor core complex 18 determines that the other radio 30 is not active when the processor core complex 18 initiates the request at block 92, the processor core complex 18 may proceed to block 98. At block 98, the processor core complex 18 may send a command to the radio 32 to use the entire pre-defined of antenna sectors, channels, and sub-channels when performing the sector level sweep.

After sending the command at block 96 or block 98, the processor core complex 18 may proceed to block 100 and receive sector sweep feedback from a responder. The responder may include any electronic device or communication station that may receive a signal during the sector level sweep performed at blocks 96 or 98. For instance, the responder may include WiGig access point 114 or a cellular base station 116, as illustrated in FIG. 9. The sector level sweep feedback may provide information related to the signal strength received by the responder when the radio 32 performed its sector level sweep in block 96 or 98.

At block 102, the processor core complex 18 may then identify which sector of the sectors swept in blocks 96 or 98 to use to establish a communication link with the communication station or the other electronic device based on the information received at block 100. That is, the sector sweep feedback information may indicate which sector had the highest signal strength. As such, in one embodiment, the processor core complex 18 may identify the sector indicated as having the highest relative signal strength as compared to the other received signals via the other swept sectors according to the sector sweep feedback.

Upon identifying the sector to use for communication, at block 104, the processor core complex 18 may send a command to the radio 32 to communicate via the identified sector of block 102. The processor core complex 18 may then return to block 92 and perform the method 90 again for each communication request by the radio 32.

By employing the method 90 described above, the processor core complex 18 may efficiently perform sector level sweeps using sectors that are likely to provide a viable communication link with another electronic device. That is, by generating the characterization table 80 and sweeping selected sectors, at given channels, and sub-channels when performing a sector level sweep, the processor core complex 18 may enable the radio 32 to perform its communication operations more quickly by avoiding sweeping sectors known to interfere with the other radio 30 and using less power by avoiding sweeping some of the available sectors.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising a radio frequency system configured to wirelessly transmit data, wherein the radio frequency system comprises:
    a plurality of radios configured to facilitate communication with one or more other electronic devices;
    a processor configured to:
        send a first command to a portion of the plurality of radios to perform a baseline measurement of a first set of receive signal quality metrics while a first radio of the plurality of radios is not active;
        send a second command to the first radio of the plurality of radios to activate;
        determine a second set of receive signal quality metrics associated with the portion of the plurality of radios for one or more sectors of an antenna while the first radio is active;
        generate a table comprising information related to the first set of receive signal quality metrics and the second set of receive signal quality metrics; and
        store the table in a memory, wherein the table is configured to indicate a portion of the one or more sectors to avoid when the first radio performs a sector level sweep to mitigate possible interference with at least one radio of the portion of the plurality of radios during the sector level sweep.

2. The electronic device of claim 1, wherein the first radio comprises a millimeter wave (MMW) radio.

3. The electronic device of claim 1, wherein the first set of receive signal quality metrics is associated with a sensitivity level of one radio of the portion of the plurality of radios without the first radio being active.

4. The electronic device of claim 1, wherein the portion of the plurality of radios is configured to communicate with one or more Wi-Fi devices, one or more global positioning system (GPS) system devices, one or more cellular devices, one or more Bluetooth devices, or any combination thereof.

5. The electronic device of claim 1, wherein the first and second sets of receive signal quality metrics comprises one or more sensitivity values or Received Signal Strength Indicator (RSSI) values associated with the one or more sectors of the sector level sweep.

6. The electronic device of claim 1, wherein the second command is configured to cause the first radio of the plurality of radios to transmit one or more signals via each of the one or more sectors of the sector level sweep.

7. The electronic device of claim 1, wherein the information comprises degradation information based on the first set of receive signal quality metrics and the second set of receive signal quality metrics.

8. The electronic device of claim 1, wherein the processor is configured to send a third command to the first radio to start beamforming using an additional portion of the one or more sectors that does not include the portion of the one or more sectors.

9. The electronic device of claim 1, wherein the processor is configured to generate the table by:
    comparing a first metric value of the second set of receive signal quality metrics to a threshold, wherein the first metric value is associated with one radio of the portion of the plurality of radios and a first sector of the one or more sectors; and
    populating an entry of the table with a zero when the first metric value is above the threshold, wherein the entry is associated with the first radio and the first sector of the one or more sectors, and where the zero is indicative that the first sector is part of the one or more sectors to avoid.

10. A tangible, non-transitory, computer-readable medium configured to store instructions executable by one or more processors of a radio frequency system, wherein the instructions comprise instructions to cause the one or more processors to:
    receive a request to start beamforming using a first radio of a plurality of radios;
    identify a second radio of the plurality of radios that is active;
    identify a first portion of a plurality of sectors to avoid for a sector level sweep associated with the beamforming based on a table comprising an indication of the first portion of the plurality of sectors when the second radio is active; and
    send a command to the first radio to perform the perform the sector level sweep avoiding the first portion of the plurality of sectors.

11. The computer-readable medium of claim 10, wherein the instructions to cause the processors to:
    receive sector sweep feedback data from a responder device after the sector level sweep is initiated, wherein the sector sweep feedback data comprises data regarding a metric associated with a signal received from each sector of a second portion of the plurality of sectors, wherein the second portion corresponds to one or more sectors of the plurality of sectors to use during the sector level sweep;

identify one of the second portion of the plurality of sectors to use for transmission based on the sector sweep feedback data; and send a second command to the first radio to communicate with the responder device via the one of the second portion of the plurality of sectors.

12. The computer-readable medium of claim 11, wherein the responder device comprises a communication station, an access point, another electronic device, or any combination thereof.

13. The computer-readable medium of claim 11, wherein the sector sweep feedback data comprises a Received Signal Strength Indicator (RSSI) value associated with the signal received from each sector of the second portion of the plurality of sectors.

14. The computer-readable medium of claim 10, wherein the instructions cause the processors to send a second command to the first radio to perform the sector level sweep using each of the plurality of sectors when none of the plurality of radios is active except for the first radio.

15. A method for operating a first radio of a plurality of radios within a radio frequency system, comprising:

sending, via one or more processors, a first command to a portion of radios of the plurality of radios to determine a first set of signal quality metrics while the first radio of the plurality of radios is not active;

determining, via the one or more processors, a second set of signal quality metrics associated with using the portion of radios of the plurality of radios when the first radio is active via one or more sectors, one or more channels, one or more sub-channels, or any combination thereof of a sector level sweep;

generating, via the one or more processors, a table comprising the second set of signal quality metrics; and storing the table in a memory, wherein the table is configured to indicate a portion of the one or more sectors, the one or more channels, the one or more sub-channels, or any combination thereof to avoid when the first radio performs a subsequent sector level sweep to mitigate potential interference with the portion of radios.

16. The method of claim 15, wherein the table is configured to indicate the portion of the one or more sectors, the one or more channels, the one or more sub-channels, or any combination thereof to avoid when the first radio performs the subsequent sector level sweep while the portion of radios of the plurality of radios is active.

17. The method of claim 15, wherein the first radio comprises a millimeter wave (MMW) radio and the portion of radios is configured to communicate with one or more Wi-Fi devices, one or more global positioning system (GPS) system devices, one or more cellular devices, one or more Bluetooth devices, or any combination thereof.

18. The method of claim 15, wherein the first and second sets of signal quality metrics comprise one or more Received Signal Strength Indicator (RSSI) values associated with the one or more sectors, the one or more channels, the one or more sub-channels, or any combination thereof.

19. The method of claim 16, comprises causing the first radio to transmit one or more second signals via each of the one or more sectors, the one or more channels, the one or more sub-channels, or any combination thereof while the second set of signal quality metrics are determined.

20. The method of claim 16, comprising sending, via the one or more processors, a second command to the first radio to start beamforming using an additional portion of the one or more sectors that does not include the portion of the one or more sectors, the one or more channels, the one or more sub-channels, or any combination thereof to avoid.

* * * * *

UNITED STATES PATENT AND TRADEMARK OFFICE
CERTIFICATE OF CORRECTION

PATENT NO. : 10,187,807 B2
APPLICATION NO. : 15/272196
DATED : January 22, 2019
INVENTOR(S) : Qiuming Li et al.

Page 1 of 1

It is certified that error appears in the above-identified patent and that said Letters Patent is hereby corrected as shown below:

In the Claims

Column 12, Line 55 (Claim 10) - remove the phrase "the perform".

Signed and Sealed this
Fifth Day of March, 2019

Andrei Iancu
*Director of the United States Patent and Trademark Office*